Patented May 19, 1942

2,283,519

UNITED STATES PATENT OFFICE 2,283,519

PIGMENTED FATTY ACID GLYCERIDE GEL AND METHOD OF MAKING

William A. Waldie, Dayton, Ohio, assignor to The Commonwealth Engineering Company of Ohio, Dayton, Ohio, a corporation of Ohio No Drawing. Application October 17, 1940, Serial No. 361,613

16 Claims. (Cl. 106—254)

This invention relates to a pigmented fatty acid glyceride product which is adapted to provide a paste for introducing pigment into paints, enamels, lacquers, inks, plastics, rubber, linoleum and cement.

It is an object of this invention to produce a product wherein the pigment is uniformly dispersed in a fatty acid glyceride vehicle forming a smooth paste without grinding the pigment with a vehicle to effect dispersion, such as has been the conventional practice heretofore.

Another object of this invention is to devise a method for making a pigmented oil paste by mixing pigments such as commonly used in making paints, enamels, plastics and the like by introducing a water wet suspension of the pigment into a saponified fatty acid mixture to thoroughly wet the pigment and then acidifying the saponified fatty acid and then esterifying the resultant product in situ with the pigment whereupon the pigment particles are thoroughly dispersed throughout the oily vehicle forming a smooth paste which is free from grit and comparable with that made heretofore by milling or grinding the pigment with the vehicle.

Another object of this invention is to produce a pigmented oil paste composition wherein a sufficiently high concentration of dispersed pigment is effected so that the paste product can be utilized in the usual manner for formulating paints, enamels and similar coating compositions by incorporating suitable amounts of the pigmented oil paste with other components for forming paint or enamel.

Another object is to provide a pigmented oil paste which is adapted for use in making printing inks and the like wherein the pigment is incorporated in a saponified fatty acid mixture which is thereafter acidified and then esterified to produce a glyceride oil vehicle in which the pigment particles are thoroughly dispersed.

These and other objects and advantages will appear hereinafter in light of the description.

In general, the process of this invention comprises the preparation of a pigmented oil paste wherein the pigment particles are dispersed throughout the vehicle without grinding or milling of the pigment into the oil vehicle. To accomplish this, a drying oil fatty acid admixture is first saponified by heat treating with alkali hydroxide and thereafter the pigment is stirred into the saponified fatty acid and the batch acidified by the addition of weak organic or inorganic acid solution. Upon acidification the water separates out and a precipitate of pigment and fatty acid is formed. The water is decanted and discarded and glycerin is then incorporated with the paste and reacted with the fatty acid components to form the mono, di and tri glycerides of the fatty acid components of the batch or a fixture of these as may be desired. The fatty acid ingredients, as initially employed, may be of the drying, semidrying or nondrying type depending upon the particular paste which it is desired to produce.

As typical examples of the method of preparing the pigmented oil dispersion products of this invention, the following are given:

Example I

| Ingredient | Unit | Amount |
|---|---|---|
| Linseed oil fatty acids | lbs | 20.00 |
| White lead | lbs | 235.00 |
| Caustic soda | lbs | 3.25 |
| Glycerin | lbs | 2.50 |
| Acetic anhydride | lbs | 5.00 |
| Water | gals | 75.00 |

The linseed oil fatty acid and caustic soda are admixed together in about two-thirds of the water, the caustic soda having been dissolved in a portion of the water, and the mixture boiled for about ten to fifteen minutes at the temperature of the boiling water to thoroughly saponify the linseed oil and fatty acid.

The white lead pigment is then introduced in an aqueous suspension comprising the remainder of the water and this pigment and the saponified fatty acid mixture are then boiled for approximately one hour after which the acetic anhydride or equivalent weak acid is added with stirring until the mixture is slightly acid to litmus. A precipitate comprising pigment and fatty acid components is formed and the water separates out which is decanted or drained off and discarded. Glycerin is then introduced into the batch and the mixture heated to approximately 260 to 275 degrees F. for about one and one-half hours to esterify the fatty acid oil components in situ with the pigment forming a paste in which the pigment is thoroughly dispersed in the glycerides of the fatty acid components.

The resultant product is a smooth white lead paste which is ready for use similarly as white lead oil paste made heretofore by grinding or milling the pigment into an oil vehicle.

Example II

| Ingredient | Unit | Amount |
|---|---|---|
| China-wood oil fatty acids | lbs | 20.00 |
| Zinc oxide | lbs | 40.00 |
| Caustic soda | lbs | 3.25 |
| Glycerin | lbs | 2.25 |
| Acetic anhydride | pts | 5.00 |
| Water | gals | 25.00 |

The method of compounding the ingredients is similar to that described in Example I and wherein the China-wood oil fatty acids are first saponified and then the pigment introduced in a water suspension and the mixture acidified and then esterified with glycerin to produce the pigmented glyceride paste product.

Example III

| | | |
|---|---|---|
| Linseed oil fatty acids | lbs | 20.00 |
| Lithopone | lbs | 40.00 |
| Caustic soda | lbs | 3.25 |
| Glycerin | lbs | 2.25 |
| Acetic anhydride | pts | 5.50 |
| Water | gals | 30.00 |

The linseed oil fatty acid is saponified with caustic soda and the pigment incorporated and the mixture acidified and finally esterified with glycerin to produce the pigmented glyceride paste similarly as in Example I.

Example IV

| | | |
|---|---|---|
| China-wood oil fatty acids | lbs | 10.00 |
| Linseed oil fatty acids | lbs | 10.00 |
| Carbon black | lbs | 5.50 |
| Caustic soda | lbs | 3.25 |
| Glycerin | lbs | 2.25 |
| Water | gals | 75.00 |

The mixture of fatty acids is boiled with caustic soda solution to saponify the fatty acid similarly as set out in the foregoing and to the saponified batch is incorporated the carbon black which has previously been made into an aqueous suspension with the remainder of the water.

The resultant reaction mixture is then acidified by adding a weak solution of hydrochloric acid (e. g. 0.1 N HCl). Upon acidifying the batch the carbon black is precipitated with the fatty acids and the water separates out which is then drawn off and discarded. Thereafter, the glycerin is added to the batch and the mixture heated to approximately 260 to 275 degrees F. to esterify the fatty acid oil components to produce the mono, di and tri glycerides thereof.

This produces a smooth black paste wherein the carbon black particles are thoroughly dispersed in a glyceride oil vehicle and the paste is ready for use in the conventional manner as similar carbon black pastes wherein the pigment is milled or ground into an oil vehicle.

Example V

| | | |
|---|---|---|
| Linseed oil fatty acids | lbs | 20.00 |
| Lamp black | lbs | 5.50 |
| Caustic soda | lbs | 3.25 |
| Glycerin | lbs | 2.25 |
| Acetic anhydride | pts | 5.50 |
| Water | gals | 75.00 |

The ingredients are compounded together similarly as in Example I to produce a smooth black paste wherein the lamp black particles are thoroughly dispersed in a glyceride oil vehicle.

In the examples, linseed and China-wood oil fatty acids have been used as the typical vegetable drying oil fatty acids. However, as stated, other drying, semidrying and nondrying oils, such as perilla, soy bean, cottonseed and fish oil, may be used in place of linseed and China-wood oil. Further, the fatty acids of dehydrated castor oil may be used if desired in compounding the pigment-oil paste. Various other pigments, such as titanium, whiting, iron oxide and the like pigments may be employed in making the pigmented oil paste products so long as the heat treatment involved is not injurious or detrimental to the pigment.

In place of caustic soda it will be understood that other alkali metal hydroxides, such as potassium, can be used to saponify the fatty acids. Ammonium hydroxide also may be used for this purpose.

In place of glycerin, other polyhydric alcohols such as the glycols and higher molecular weight alcohols such as sorbitol, mannitol and pentahydric alcohol can be used.

Other weak organic and inorganic acids can be used in place of acetic and hydrochloric acids, such as formic, propionic, or their acid anhydrides.

The essential steps in the process of compounding the pigmented paste which produces the unexpectedly high dispersion of pigment without requiring milling or grinding of the pigment in the vehicle are the formation of a soap or equivalent pigment-oil wetting agent which functions to assist in dispersing the pigment particles throughout the fatty acid vehicle and thereafter the subsequent esterification of the fatty acid reaction product in situ with the pigment particles in their dispersed condition, whereupon a smooth paste is produced.

Further, it will be understood that admixtures of various pigments as well as mixtures of different fatty acids may be utilized in compounding the pigment-oil paste in accordance with this invention.

It will also be understood that this invention is not limited to the particular ingredients set out in the examples and that the process may be varied as required for different ingredients and the uses to which the product is to be put.

Having thus fully described my invention, what I claim as new and desire to secure by Letters Patent is:

1. A method of making a pigmented oil product comprising reacting fatty oil fatty acids with an alkali to form a soap, mixing pigment in the form of an aqueous suspension into said soap to thoroughly coat the particles of the pigment therewith, acidifying the mixture to thereby liberate free fatty acids, removing the water which separates out, adding glycerin, and heating the mixture to esterify the fatty acids to produce the glycerides thereof in which the pigment particles are thoroughly dispersed.

2. A method of making a pigmented oil product comprising reacting vegetable drying oil fatty acids with an alkali to form a soap, mixing pigment in the form of an aqueous suspension into said soap to thoroughly coat the particles of the pigment therewith, acidifying the mixture to thereby liberate free fatty acids, removing the water which separates out, adding glycerin, and heating the mixture to esterify the fatty acids to produce the glycerides thereof in which the pigment particles are thoroughly dispersed.

3. A method of making a pigmented oil product comprising reacting drying fatty oil fatty acids with an alkali to form a soap, mixing pigment in the form of an aqueous suspension into said soap to thoroughly coat the particles of the pigment therewith, acidifying the mixture to thereby liberate free fatty acids, removing the water which separates out, adding glycerin, and heating the mixture to esterify the fatty acids to produce the glycerides thereof in which the pigment particles are thoroughly dispersed.

4. A method of making a pigmented oil product comprising reacting semi-drying fatty oil fatty acids with an alkali to form a soap, mixing pigment in the form of an aqueous suspension into said soap to thoroughly coat the particles of the pigment therewith, acidifying the mixture to thereby liberate free fatty acids, removing the water which separates out, adding glycerin, and heating the mixture to esterify the fatty acids to produce the glycerides thereof in which the pigment particles are thoroughly dispersed.

5. A method of making a pigmented oil product comprising reacting non-drying fatty oil fatty acids with an alkali to form a soap, mixing pigment in the form of an aqueous suspension into said soap to thoroughly coat the particles of the pigment therewith, acidifying the mixture to thereby liberate free fatty acids, removing the water which separates out, adding glycerin, and heating the mixture to esterify the fatty acids to produce the glycerides thereof in which the pigment particles are thoroughly dispersed.

6. A method of making a pigmented oil product comprising reacting linseed oil fatty acids with an alkali to form a soap, mixing pigment in the form of an aqueous suspension into said soap to thoroughly coat the particles of the pigment therewith, acidifying the mixture to thereby liberate free fatty acids, removing the water which separates out, adding glycerin, and heating the mixture to esterify the fatty acids to produce the glycerides thereof in which the pigment particles are thoroughly dispersed.

7. A method of making a pigmented oil product comprising reacting fatty oil fatty acids with an alkali to form a soap, mixing a pigment comprising carbon black, in the form of an aqueous suspension into said soap to thoroughly coat the particles of the pigment therewith, acidifying the mixture to thereby liberate free fatty acids, removing the water which separates out, adding glycerin, and heating the mixture to esterify the fatty acids to produce the glycerides thereof in which the pigment particles are thoroughly dispersed.

8. A method of making a pigmented oil product comprising reacting fatty oil fatty acids with an alkali to form a soap, mixing a pigment comprising zinc oxide in the form of an aqueous suspension into said soap to thoroughly coat the particles of the pigment therewith, acidifying the mixture to thereby liberate free fatty acids, removing the water which separates out, adding glycerin, and heating the mixture to esterify the fatty acids to produce the glycerides thereof in which the pigment particles are thoroughly dispersed.

9. A method of making a pigmented oil product comprising reacting fatty oil fatty acids with an alkali to form a soap, mixing a pigment comprising white lead in the form of an aqueous suspension into said soap to thoroughly coat the particles of the pigment therewith, acidifying the mixture to thereby liberate free fatty acids, removing the water which separates out, adding glycerin, and heating the mixture to esterify the fatty acids to produce the glycerides thereof in which the pigment particles are thoroughly dispersed.

10. A method of making a pigmented oil product comprising reacting soy bean oil fatty acids with an alkali to form a soap, mixing pigment in the form of an aqueous suspension into said soap to thoroughly coat the particles of the pigment therewith, acidifying the mixture to thereby liberate free fatty acids, removing the water which separates out, adding glycerin, and heating the mixture to esterify the fatty acids to produce the glycerides thereof in which the pigment particles are thoroughly dispersed.

11. A method of making a pigmented oil product comprising reacting cotton seed oil fatty acids with an alkali to form a soap, mixing pigment in the form of an aqueous suspension into said soap to thoroughly coat the particles of the pigment therewith, acidifying the mixture to thereby liberate free fatty acids, removing the water which separates out, adding glycerin, and heating the mixture to esterify the fatty acids to produce the glycerides thereof in which the pigment particles are thoroughly dispersed.

12. A method of making a pigmented oil product comprising reacting fatty oil fatty acids with an alkali to form a soap, mixing pigment in the form of an aqueous suspension into said soap to thoroughly coat the particles of the pigment therewith, acidifying the mixture with acetic anhydride to thereby liberate free fatty acids, removing the water which separates out, adding glycerin, and heating the mixture to esterify the fatty acids to produce the glycerides thereof in which the pigment particles are thoroughly dispersed.

13. A method of making a pigmented oil product comprising reacting fatty oil fatty acids with an alkali to form a soap, mixing pigment in the form of an aqueous suspension into said soap to thoroughly coat the particles of the pigment therewith, acidifying the mixture with hydrochloric acid to thereby liberate free fatty acids, removing the water which separates out, adding glycerin, and heating the mixture to esterify the fatty acids to produce the glycerides thereof in which the pigment particles are thoroughly dispersed.

14. A method of making a pigmented oil product comprising reacting fatty oil fatty acids with an alkali to form a soap, mixing pigment in the form of an aqueous suspension into said soap to thoroughly coat the particles of the pigment therewith, acidifying the mixture with formic acid to thereby liberate free fatty acids, removing the water which separates out, adding glycerin, and heating the mixture to esterify the fatty acids to produce the glycerides thereof in which the pigment particles are thoroughly dispersed.

15. A method of making a pigmented oil product comprising reacting fatty oil fatty acids with an alkali to form a soap, mixing pigment in the form of an aqueous suspension into said soap to thoroughly coat the particles of the pigment therewith, acidifying the mixture to thereby liberate free fatty acids, removing the water which separates out, adding polyhydric alcohol, and heating the mixture to esterify the fatty acids to produce the glycerides thereof in which the pigment particles are thoroughly dispersed.

16. A method of making a pigmented oil product comprising reacting fatty oil fatty acids with an alkali to form a soap, mixing pigment in the form of an aqueous suspension into said soap to thoroughly coat the particles of the pigment therewith, acidifying the mixture to thereby liberate free fatty acids, removing the water which separates out, adding polyhydric alcohols of the class consisting of glycerin, glycol, sorbitol, mannitol and pentahydric alcohol, and heating the mixture to esterify the fatty acids to produce the glycerides thereof in which the pigment particles are thoroughly dispersed.

WILLIAM A. WALDIE.